(12) United States Patent
Chliwnyj et al.

(10) Patent No.: US 6,903,895 B2
(45) Date of Patent: Jun. 7, 2005

(54) TAPE DRIVE SERVO OPERATION BY USE OF SERVO PATTERN WIDTH MEASUREMENTS

(75) Inventors: Alex Chliwnyj, Tucson, AZ (US); David Lee Swanson, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 151 days.

(21) Appl. No.: 10/424,373

(22) Filed: Apr. 28, 2003

(65) Prior Publication Data

US 2004/0212915 A1 Oct. 28, 2004

(51) Int. Cl.[7] .............................. G11B 5/55
(52) U.S. Cl. ........................ 360/78.02; 360/77.12
(58) Field of Search ......................... 360/78.02, 75, 360/77.12

(56) References Cited

U.S. PATENT DOCUMENTS

| | | | |
|---|---|---|---|
| 5,448,430 A | 9/1995 | Bailey et al. ............ 360/78.02 |
| 5,629,813 A | 5/1997 | Baca et al. .............. 360/78.02 |
| 5,675,448 A | * 10/1997 | Molstad et al. .......... 360/77.12 |
| 5,872,672 A | 2/1999 | Chliwnyj et al. ......... 360/77.12 |
| 5,946,159 A | 8/1999 | Chliwnyj et al. ......... 360/77.12 |
| 6,222,698 B1 | * 4/2001 | Barndt et al. ................. 360/76 |
| 6,757,128 B2 | * 6/2004 | Yip ......................... 360/77.12 |
| 6,798,607 B2 | * 9/2004 | Chliwnyj et al. ........ 360/78.02 |

* cited by examiner

Primary Examiner—Andrew S. Sniezek
Assistant Examiner—James L Habermehl
(74) Attorney, Agent, or Firm—Allen K. Bates (57) ABSTRACT

A system, method and an article of manufacture to provide more accurate magnetic tape servo operation are disclosed. Accurate measurements of the width of the servo pattern written on the magnetic tape are accomplished in the presence of relatively large motion of the magnetic tape. The accurate measurements of the width of the servo pattern are used to produce a corrected position error signal that provides improved servo track following to maintain the tape head at an optimal alignment for writing and reading data tracks on the tape.

21 Claims, 7 Drawing Sheets

| Head Track No. | Head Module L | R |
|---|---|---|
| 1 | WR | RD |
| 2 | RD | WR |
| 3 | WR | RD |
| 4 | RD | WR |
| 5 | WR | RD |
| 6 | RD | WR |
| 7 | WR | RD |
| 8 | RD | WR |
| Servo | LS1 | RS1 |
| Servo | LS2 | RS2 |
| 9 | WR | RD |
| 10 | RD | WR |
| 11 | WR | RD |
| 12 | RD | WR |
| 13 | WR | RD |
| 14 | RD | WR |
| 15 | WR | RD |
| 16 | RD | WR |
| Servo | LS3 | RS3 |
| Servo | LS4 | RS4 |
| 17 | WR | RD |
| 18 | RD | WR |
| 19 | WR | RD |
| 20 | RD | WR |
| 21 | WR | RD |
| 22 | RD | WR |
| 23 | WR | RD |
| 24 | RD | WR |
| Servo | LS5 | RS5 |
| Servo | LS6 | RS6 |
| 25 | WR | RD |
| 26 | RD | WR |
| 27 | WR | RD |
| 28 | RD | WR |
| 29 | WR | RD |
| 30 | RD | WR |
| 31 | WR | RD |
| 32 | RD | WR |

TAPE DRIVE SERVO OPERATION BY USE OF SERVO PATTERN WIDTH MEASUREMENTS

TECHNICAL FIELD

The present invention relates generally to linear data storage devices with servo controlled head positioning. More particularly, the invention provides improved servo operation in a magnetic tape data storage device by providing a corrected position error signal for accurate track following.

BACKGROUND OF THE INVENTION

A data storage medium will often contain various servo signals to precisely position the read/write heads with respect to the tracks of data stored on the medium. Magnetic tape systems, such as the IBM 3590, use servo patterns on the data storage medium to generate the servo signals used to position the read/write heads. In the IBM 3590 tape cartridges, the servo pattern is often pre-written on data storage medium (magnetic tape) contained in the cartridge. The servo pattern for the IBM 3590 includes three pairs of servo edges, each edge being a boundary between the adjacent contrasting servo signals written on the tape. Nominally, the physical separation between paired servo edges is the same as the data track pitch, e.g. 80-microns. The IBM Model 3590 tape drive uses the locations of these servo edges to determine proper placement of the written data tracks.

Drives such as the IBM Model 3590 tape drive determine servo pattern edge positions magnetically by reading the pre-written servo patterns. The servo pattern position may be imperfect, and the servo pattern pitch frequently differs by a small amount from the nominal servo pattern pitch of 80 microns.

In the IBM 3590 tape drive, servo patterns written on the tape are monitored and followed to ensure that the drives' read/write heads are correctly placed on the tape to read or write the desired data. Repeatable vertical data track placement is essential to avoid errors that may occur when reading and writing data. A misplaced read/write head could read data from an adjacent track during a read operation or when writing data it is possible to overwrite existing data on an adjacent track. Each servo pattern edge is the boundary line between a constant frequency pattern and intermittent bursts of a second frequency, as described in prior art. Correct data track placement assumes that the servo edges are exactly 80 microns apart. The magnetic tapes are servo formatted to achieve the 80 micron spacing. The servo readers on the head are 160 microns apart. The combinations of the servo readers and the two servo edges spaced 80 microns apart give the 80 microns spacing of the data tracks on the tape. Variations in the servo patterns may result in a data track placement error. Therefore, the actual width of the servo pattern must be measured to establish the edge positions so that the data tracks are placed correctly. By placing the tracks more accurately, a lower error rate is achieved and the possibility of destroying customer data is reduced.

In the prior art systems, the servo apparatus only addressed making the measurements and corrections in a tape path where the tape is edge guided. It was necessary for the tape motion to be relatively small for the measurements to be accurate. There was no contemplation in the prior art of a system where the tape would be allowed to move freely on a scale on the order of magnitude as the measurement. In the present day tape drive, which may consist of an open channel tape path with the tape moving, the prior art measurement schemes are made completely invalid. The present invention overcomes this limitation and is required to achieve the correct track placement in a tape path where a tape motion is relatively large.

In the prior art, a center band of the servo pattern written on the tape, an intermittent signal, is assumed to be 80 microns wide, and thus the pair of servo edges are spaced 80 microns apart. In practice, there is variation in the servo pattern so that this assumption can cause errors in accurately locating the data tracks on the tape. Because of the potential for servo errors, there is a need to accurately measure the width of the magnetic tape servo pattern when tape motion is relatively large.

SUMMARY OF THE INVENTION

It is an object of the present invention, to provide an enhanced servo system for linear data storage devices. The present invention provides more accurate tape servo pattern following by measuring the width of the center band of the servo pattern written on the magnetic tape. The measured width is used to produce a corrected position error signal that provides improved servo track following to maintain the tape head at an optimal alignment for writing and reading data tracks on the tape.

The present invention provides a number of distinct advantages. For example, the invention precisely compensates for substantial variations in the separation between servo pattern edges that define the servo pattern. The invention, therefore, helps avoid writing tracks of data at the wrong positions, possibly overwriting previously stored data. Accordingly, the invention is particularly useful in modern high density tape storage systems where adjacent data tracks have no intervening guard band and the servo pattern determines the data track spacing.

In a first embodiment the width of the servo pattern written on the magnetic tape is measured each time a cartridge containing the magnetic tape is inserted into the tape drive. The head position servo is enabled while the servo read element is positioned at the upper edge of the servo pattern. A periodic signal is then injected into the head position servo to move the head relative to the servo pattern edge. The PES response for the servo read element on the upper edge and a first measurement position corresponding to the upper edge are obtained. The servo read element is then moved to the lower edge. The PES response for the servo read element on the lower edge and a second measurement position corresponding to the lower edge are obtained. The periodic signal is then adjusted to move the magnetic head so that the servo read element moves between the first and second measurement positions. The periodic signal is further adjusted to reduce any errors resulting from magnetic tape motion relative to the magnetic tape head containing the servo read element. Multiple measurements of the servo pattern width are obtained as this periodic signal drives the magnetic head to move between the upper and lower edges, and then processed to obtain an accurate measurement of the servo pattern width. The resulting servo pattern width is used to provide a calibrated offset for the head position servo which compensates for any deviation of the written width of the center band of the servo pattern. The actual width of the servo pattern is measured each time the tape is introduced into a drive as part of an initialization process resulting in improved head position servo performance.

An object of the present invention, therefore, is to provide a process for more accurately placing the heads of a linear data storage device relative to the track of the tape.

Another object of the present invention is to provide an improved servo control head positioning system for linear data storage devices using measurements taken from the linear medium to more accurately position the head-to-track alignment.

BRIEF DESCRIPTION OF THE DRAWINGS

The nature, objects, and advantages of the invention will become more apparent to those skilled in the art after considering the following detailed description in connection with the accompanying drawings in which like reference numbers designate like parts throughout, wherein.

DETAILED DESCRIPTION OF THE PREFERRED EMBODIMENTS

One aspect of the present invention concerns a tape storage system such as that shown in the U.S. Pat. No. 5,946,159 issued on Aug. 31, 1999 and entitled, "Servo Edge Correction Using Edge Samples Taken by Independently Positioned Servo Elements" in the names of Alex Chliwnyj, et al and assigned to the assignee of the present invention. The entirety of the '159 patent is incorporated herein by reference. The present invention is an improvement to the '159 patent.

Figure 1:
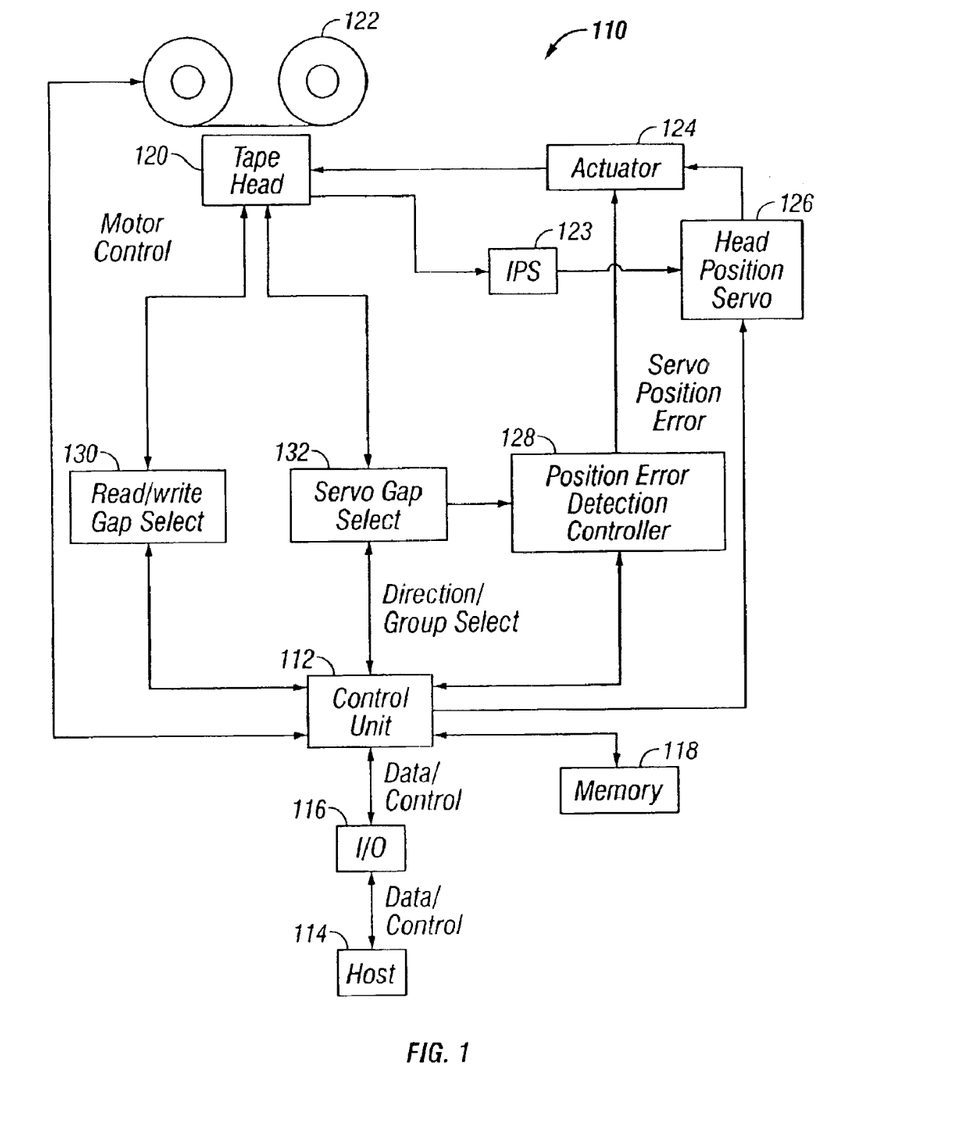
FIG. 1 is a diagram of the hardware components and interconnections of one embodiment of the invention.

In FIG. 1, a tape storage system 110 includes hardware components and interconnections used in the present invention. Broadly, the system 110 operates to read and write data from and to a magnetic tape 122 that contains servo information for transversely guiding a tape head 120. Herein, the term magnetic tape head and tape head are used interchangeably to describe the magnetic tape head used with a magnetic tape in a tape drive. In the preferred embodiment, the system 110 includes features of the tape system of U.S. Pat. No. 5,448,430, entitled "Track Following Servo Demodulation", issued on Sep. 5, 1995 in the names of Bailey, et al. The entirety of the '430 patent is incorporated herein by reference.

The system 110 includes a control unit 112 that exchanges data and control signals with a host 114 through an interface 116. The control unit 112 is interconnected to a memory device 118 such as random access memory to store various data such as tape head calibration information. The control unit 112 is also interconnected to tape reel motors and tachometer (not shown) to control the direction, velocity and acceleration of the magnetic tape 122.

The system 110 also includes a position error controller 128 to direct positioning actuator 124 during servo controlled track followings. The actuator 124 may comprise, for example, a highly precise stepper motor or a voice coil motor. The position error controller 128 includes components for generating position error signals (PESs). In the illustrated embodiment, a total of three PESs are generated simultaneously from signals provided by three servo read elements located on the tape head 120. Each of the PESs provides a signal that is proportional to the position of each servo read element relative to each servo pattern edge.

Depending upon the needs of the application, the position error detection controller 128 may generate PESs according to a new or a known technique. The generation of PESs, which is well known, is described in the following references: (1) U.S. Pat. No. 5,448,430, mentioned above, and (2) U.S. Pat. No. 5,872,672, entitled, "System and Method for Monitoring and Analyzing Tape Servo Performance", issued on Feb. 16, 1999 in the names of Chliwnyj, et al, and assigned to the assignee of the present invention. A discussion of the detection and mitigation of offset errors in PESs is found in U.S. Pat. No. 5,629,813, entitled, "Initialization and Calibration of Magnetic Tape Having Multiple Sensor Areas", issued on May 13, 1997, to Baca, et al and assigned to the assignee of the present invention. Each of the foregoing references is hereby incorporated herein by reference in their entirety.

The system 110 also includes a number of different positioning components. First the actuator 124 directs movement of the tape head 120 in a transverse direction relative to the magnetic tape movement direction. A related component is IPS 123, which provides a precise output signal representing the transverse position of the tape head 120 with respect to a tape path of the magnetic tape 122. Transverse positioning refers to movement of the tape head 120 across the width of the magnetic tape 122, generally perpendicular to the longitudinal movement of the magnetic tape 122. The IPS 123 may include electrical, optical, mechanical components, and/or other suitable components. The sensor may comprise, for example, an optical tachometer adjacent to the head 120, or another suitable sensors of micron-level accuracy. As one example, the IPS 123 may be embodied by an "independent position sensor" or "IPS" implemented in the IBM model 3590 tape drive, which is commercially available from IBM Corporation of Armonk, N.Y.

The IPS 123 provides its output signal to a head position servo 126. Head position servo 126 is a control system that maintains tape head 120 at a controlled position relative to magnetic tape 122. When the tape head 120 is to be moved to a selected index position, the control unit 112 activates the head position servo 126 to transmit an appropriate signal to the actuator 124. Signals from the IPS 123 provide feedback to the head position servo 126 to ensure satisfactory index positioning. In an exemplary embodiment, the head position servo 126 may be embodied by a digital signal processor, such as a Texas Instruments model TMS320C50.

Figure 2:
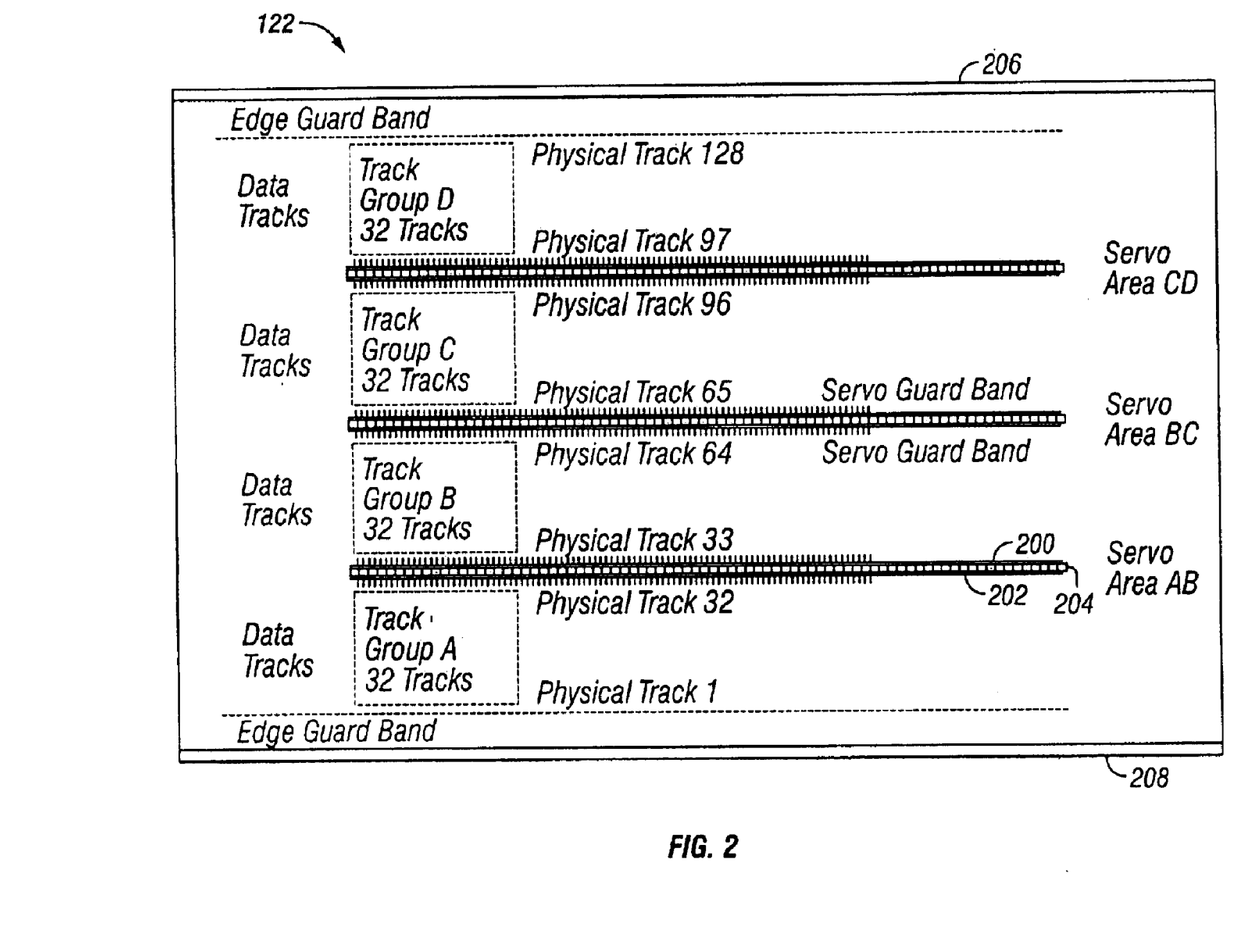
FIG. 2 is a diagram of a magnetic tape depicting parallel servo patterns according to one embodiment of the invention.
Figure 3:
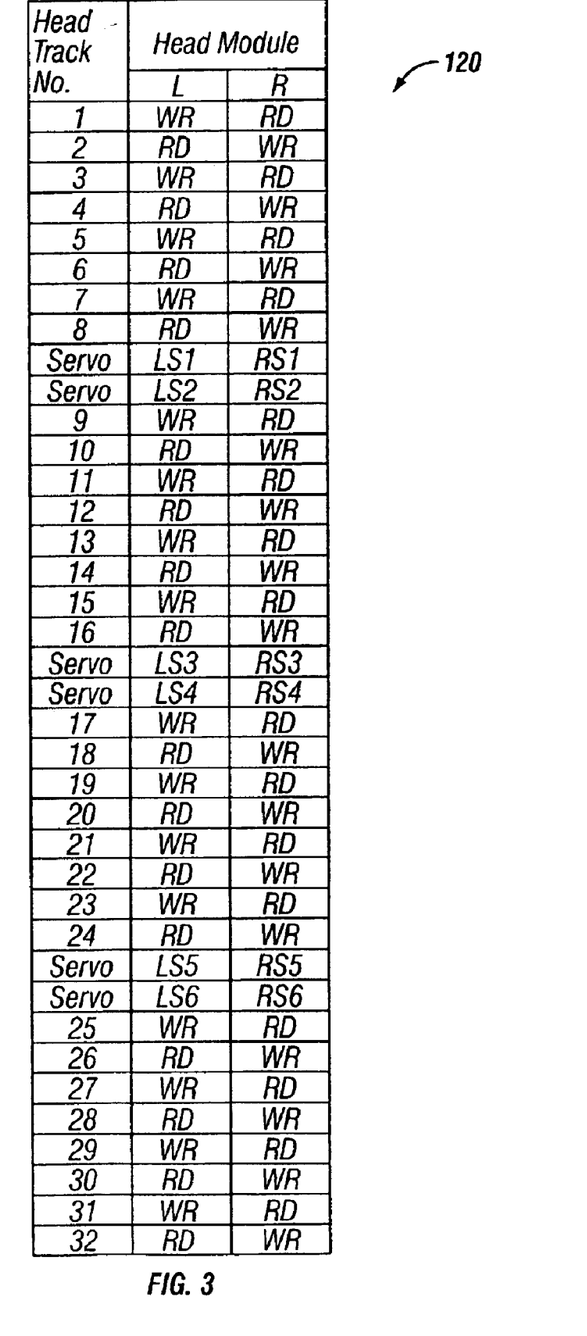
FIG. 3 is a diagram of a magnetic tape head in accordance with the invention.

FIG. 2 illustrates the format of a magnetic tape 122 corresponding to tape head 120. Magnetic tape 122 has four data track groups A, B, C, and D, having thirty-two parallel data tracks each. The magnetic tape 122 also has three parallel servo areas AB, BC, and CD symmetrically spaced across the tape width between the four data track groups A–D. The data track groups A–D and the servo areas AB, BC, and CD extend longitudinally the length of the magnetic tape 122. In some implementations, guard bands may be situated between the tape edges and the first and last data tracks, and between the boundaries of each servo area AB, BC, and CD and adjacent data tracks. Each servo area includes two outer tracks (e.g. 200, 202), having a recorded servo pattern of one frequency (called "F1"). Between each pair of outer tracks (e.g. 200, 202) lies a middle track (e.g. 204) having a different recorded servo pattern of a second frequency (called "F2"). The two boundaries between F1 and F2 regions provide servo pattern edges. As shown in FIG. 2, the magnetic tape 122 has an upper boundary 206 and a lower boundary 208. The magnetic tape head 120 preferably comprises a thin-film magneto-resistive transducer. The head 120 includes data read/write elements to record and data to and read data from the magnetic tape 122. Preferably, the head 120 includes a plurality of transversely displaced data read/write elements to read from parallel tracks of an appropriate magnetic tape 122, such as a 128-track IBM model 3590 tape. The head 120 also includes multiple servo read elements to read servo signals recorded on the magnetic tape 122. In an illustrative embodiment, the tape head 120 may be constructed as shown in FIG. 3. The height of the tape head 120 substantially corresponds to the width of the tape 122. The tape head 120 includes thirty-two read/write element pairs (labeled "RD" and "WR") and three sets of servo read elements (e.g. LS1, RS6) corresponding to the three servo areas AB, BC and CD. In the illustrated embodiment, the thirty-two parallel data track positions are divided into groups of eight, adjacent groups being separated two tracks occupied by a group of four servo elements. Each group of four servo elements may be referred to as a servo group e.g. LS1, RS1, LS2, and RS2. For further identification, servo elements pairs 1, 3, and 5 occupy upper positions, whereas pairs 2, 4, and occupy lower positions. The tape head 120 includes left and right modules separately fabricated, then bonded together. Data write and read elements alternate transversely down the height of each module (i.e., across the width of the tape), beginning with a data write element in position on the left module and a data read element in the corresponding position on the right module. Thus, each data write element in the left module is paired with a data read element in the corresponding position on the right module and each data read element in the left module is paired with a data write element in the corresponding position on the right module such data that write/read element pairs alternate transversely with data read/write element pairs.

Figure 4:
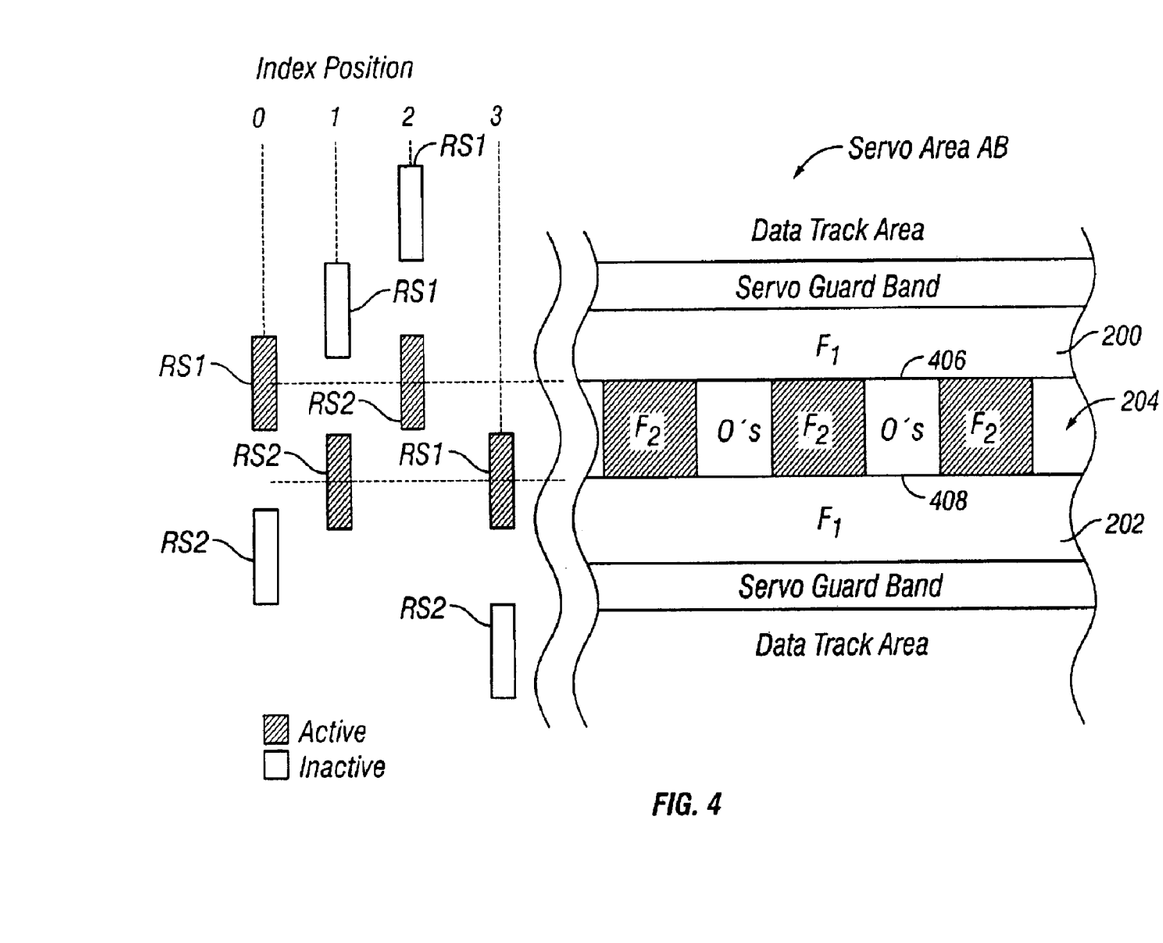
FIG. 4 is a diagram of an exemplary servo area of a magnetic tape head according to one embodiment of the invention.

FIG. 4 depicts the servo area AB in greater detail, along with various alignments between servo pattern edges of the area AB and the servo elements RS1 and RS2 (FIG. 2). Nearby servo elements of the same group (i.e., LS1 and LS2) are not depicted, for clarity of illustration. The servo area AB includes two outer tracks 200 and 202, and a middle track 204 as discussed above. The junction of the tracks 200 and 204 defines a first or "upper" servo pattern edge 406; likewise, the junction of the tracks 204 and 202 defines a second or "lower" servo edge 408 of the servo area AB. Four index positions 0–3 are illustrated in FIG. 4 for the tape head 120. At index-0, the servo element RS1 is aligned with the upper servo pattern edge 406. At index-1, the tape head 120 has been transversely shifted with respect to the magnetic tape 122 to align the servo element RS2 with the lower edge 408. At index-2, the servo element RS2 is aligned with the upper servo pattern edge 406. At index-3, the servo element RS1 is aligned with the lower edge 408. The four index positions 0–3 enable the thirty-two data read/write elements of the tape head 120 to access one-hundred-twenty-eight data tracks on the magnetic tape 122. As the magnetic tape 122 travels past the magnetic tape head 120 in one direction, the control unit 112 may direct the index controller 126 to position the transducer 120 in a first desired index position. The sixteen odd-numbered data read/write element pairs are enabled and access the following data tracks: 2nd, 10th, 18th, . . . , 114th, and 122nd. The tape direction is reversed for a second pass, the first index position is maintained, and the sixteen even-numbered data elements are enabled to access the following data tracks: 6th, 14th, 22nd, 118th, and 126th. For a third pass, the head is indexed to the next position, the tape moved forward, and the odd data elements are enabled to access the 3rd, 11th, 19th, . . . , 115th, and 123rd data tracks. The entire tape can be accessed in such a fashion, sixteen tracks at a time, with a total of four index positions and eight passes, four in each direction.

OPERATION

In addition to the various hardware embodiments described above, a different aspect of the invention concerns a method for more accurate servo track following. This method may be implemented, for example, by operating the head position servo 126 to execute a sequence of machine-readable instructions.

These instructions may reside in various types of data storage medium. In this respect, one aspect of the present invention concerns an article of manufacture, comprising a data storage medium tangibly embodying a program of machine-readable instructions executable by a digital data processor to perform method steps to detect, correct, and follow servo edges using independent position information.

This data storage medium may comprise, for example, volatile or non-volatile memory of the head position servo 126, for example. Alternatively, the instructions may be contained in another data storage medium, such as a magnetic data storage diskette. Whether contained in the head position servo 126 or elsewhere, the instructions may instead be stored on another type of data storage medium such as RAM, DASD storage (e.g., a conventional "hard drive" or a RAID array), magnetic tape, electronic read-only memory (e.g., ROM), optical storage device (e.g., WORM), or other data storage media.

In the illustrated embodiment of the invention, where the machine-readable instructions reside in the head position servo 126, the machine-readable instructions may comprise lines of compiled TMS320C50 language assembly code.

As discussed above, the invention generally facilitates accurate magnetic tape servo track following. This is achieved by first establishing servo pattern edge locations and then accurately measuring the difference between the servo pattern edges. The distance between the servo pattern edges is used to provide corrected position error signals (PESs) for use in track following to maintain the tape head at optimal alignment for accurate alignment of the data tracks on the magnetic tape.

The operational sequence of the present invention is discussed in greater detail below, with the aid of a more specific example.

OPERATIONAL SEQUENCE

Figure 5:
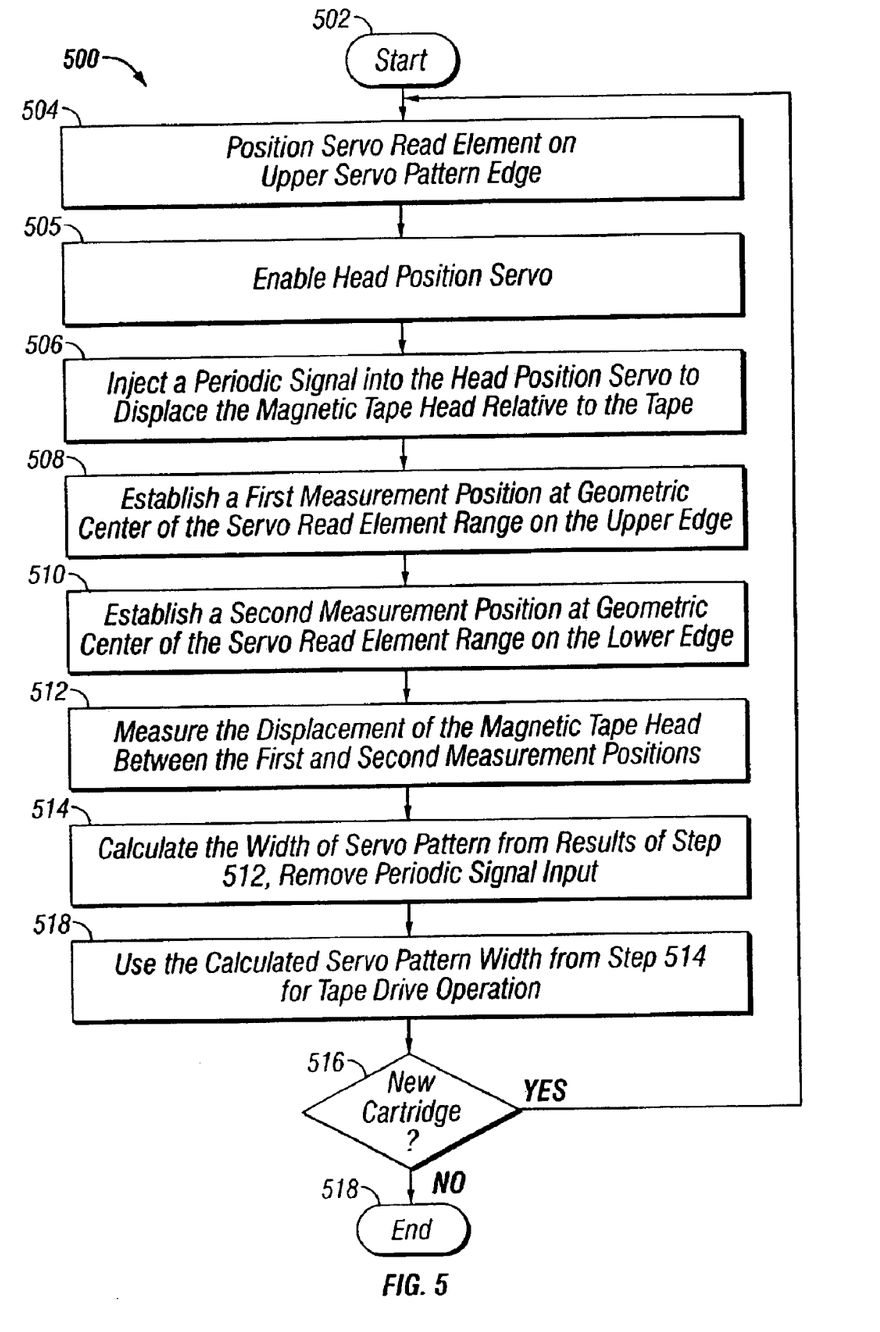
FIG. 5 is a flowchart illustrating an exemplary sequence of steps to measure the width of a servo pattern written on magnetic tape in accordance with the invention.

FIG. 5 shows flowchart 500 of a series of operations to illustrate one example of the operation of the present invention. For ease of explanation, but without any limitation intended thereby, the example of FIG. 5 is described in the context of the tape system 110 described above.

The sequence 500 begins at step 502. At step 504 the tape head 120 is moved to a position to read the upper servo pattern edge 406 with one of the servo read elements (for example index position 0, servo element RS1 shown in FIG. 4). IPS 123 is used in step 504 to provide a signal to position the head at the index position. Indexing of the tape head 120 at step 504 aligns three of the servo read elements with three of the upper servo edges simultaneously. For example, at index position 0 (FIG. 4, only servo element RS1 is shown), servo elements LS1, RS1, LS3, RS3, LS5 and RS5 may first be aligned with the upper edges of the servo areas CD, BC, and AB, respectively (FIGS. 2–3). Index position 1 (FIG. 4) will align servo elements LS2, RS2, LS4, RS4, LS6 and RS6 with the lower edges of the servo areas CD, BC, and AB, respectively. Index position 2 (FIG. 4) will align servo elements LS2, RS2, LS4, RS4, LS6 and RS6 with the upper edges of the servo areas CD, BC, and AB, respectively. Index position 3 (FIG. 4) will align servo elements LS1, RS1,LS3, RS3, LS5 and RS5 with the lower edges of the servo areas CD, BC, and AB, respectively. The operation of the present invention will be described in reference to the index position described above, however other index positions may be used to perform the operation of the invention (for different magnetic tape formats, magnetic tape head configurations, or other variations) on other servo areas located on magnetic tape 122. Accordingly, a variety of servo pattern edges and servo elements are matched to obtain a varient of servo pattern edge samples.

The pre-alignment of step 504 aligns the servo elements with the expected locations of the respective servo pattern edges. The expected or nominal servo pattern edge locations are those locations where servo edges were optimally written during manufacturing or formatting of the magnetic tape 122. However, as explained above, servo pattern edges may exhibit variations between the expected or nominal locations where the servo edges should be placed, and where the servo edges are actually placed, i.e., their actual locations.

As mentioned above, the IPS 123 contains components for precisely positioning the tape head 120 with resolution on the micron level. Therefore, step 504 precisely positions the servo elements with respect to the corresponding servo edges nominal locations.

Preferably, the reels holding magnetic tape 122 are operated to continuously advance the magnetic tape 122. Thus, at each different indexing of the tape head, the magnetic tape 122 is being moved past the tape head 120. Concurrently, each pre-aligned servo element is operated to sense its corresponding servo pattern edge, taking a plurality of samples of the servo edge. These output signals are averaged and further processed by the position error detection controller 128 to provide a corresponding PES. In the present disclosure, a positive (+) PES indicates that the actual servo edge is closer to the lower boundary 208 of the magnetic tape than the servo element (i.e. Below); a negative (−) PES indicates that the actual servo edge is closer to the upper boundary 206 of the magnetic tape than the servo element (i.e., above).

At step 505 the head position servo 126 is enabled. Position error detection controller 128 supplies the processed PES signal to the head position servo 126. This enables tape head 120 to maintain a controlled position relative to the horizontal (width) position of magnetic tape 122 as the magnetic tape 122 is moved horizontally past the tape head 120. The tape head 120 is now in a position relative to the magnetic tape 122 to position three of the servo read elements over the upper edges of three of the servo patterns. For ease of understanding, the operation of the invention will be described by use of only one servo read element and one servo pattern with the understanding that all three servo read elements and corresponding servo patterns may be used in the actual operation of the invention. The operation of the invention may also be extended to any number of servo read elements and the corresponding servo patterns by processing the outputs from the servo read elements to provide an appropriate PES signal.

Steps involved in the generation of PESs are not discussed further, as many techniques for PES generation are already known, and the process as implemented in the present invention should be apparent to ordinarily skilled artisans having the benefit of this disclosure. For example, generation of PES may be accomplished in accordance with techniques explained in the '430 patent and '672 patents, referenced above. The PESs from one or more of the servo read elements may be combined or used separately for use of the present invention. For the present invention all combinations of servo element and servo edge alignments may be exhausted to produce the robust operation of the tape drive. Advantageously, this provides a comprehensive sampling of PESs, taking into account offsets due to module-to-module variations, azimuth effects, magnetic tape and formatting imperfections, and other head-tape dynamics that may exist between different combinations of servo elements and servo edges Referring now to FIG. 4, the tape head 120 is placed at index position 0 as the result of step 504. This places servo read element RS1 at upper servo pattern edge 406 and the head position servo 126 is enabled to maintain this position of servo read element RS1 as the magnetic tape 122 moves under guiding forces.

Figure 7:
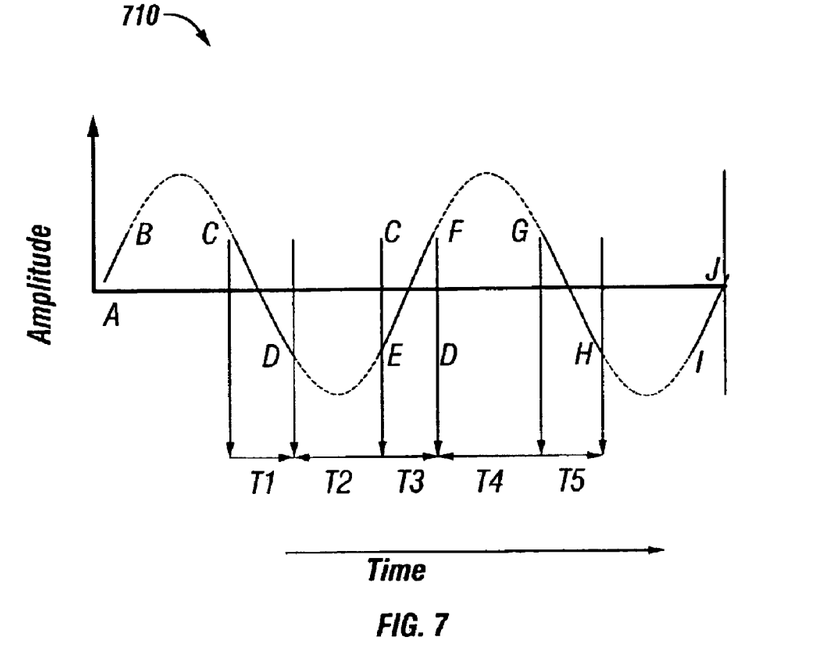
FIG. 7 is an illustration of a periodic signal that is used to move the magnetic tape head to measure the width of a servo pattern written on magnetic tape in accordance with the invention.
Figure 8:
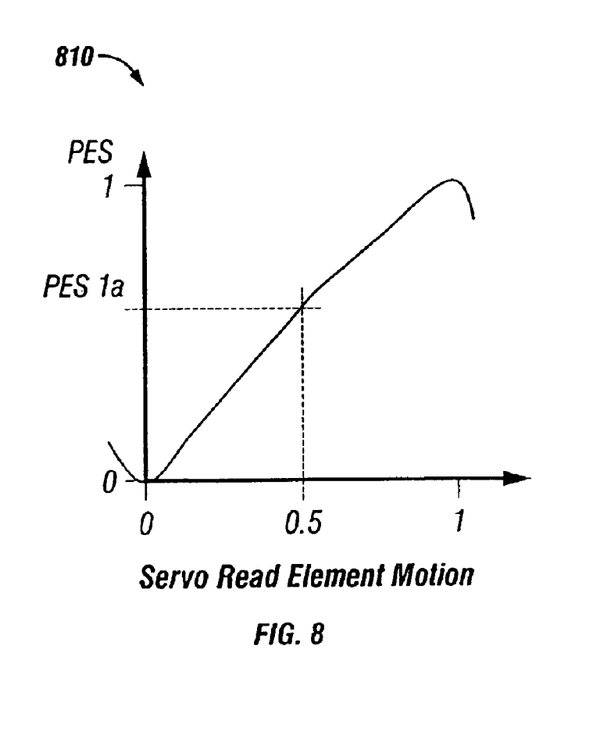
FIG. 8 is an illustration a position error signal obtained from a servo read element over the range of movement of the servo read element in accordance with the invention.

At step 506 periodic signal 710 is injected into the head position servo 126 to move servo read element RS1 relative to upper servo pattern edge 406. FIG. 7 shows a sinusoidal signal that is an example of periodic signal 710 that may be used. Alternatively a square wave shaped periodic signal or combination of sinusoidal signals may be used to produce a resulting periodic signal. Periodic signal 710 shown in FIG. 7 is a signal that varies with time. The horizontal axis is time and the vertical axis in amplitude in arbitrary units. At step 508 a first measurement position is established that is at the geometric center of the servo read element RS1's range when the servo read element RS1 is positioned at the upper servo pattern edge 406. This is accomplished by using the periodic signal 710 injected into the head position servo 126 to move servo read element RS1 relative to upper servo pattern edge 406 while monitoring the PES signal. Step 504 placed servo read element RS1 at (index position 0) the upper servo pattern edge 406. Periodic signal 710 is adjusted to move servo read element RS1 over a range that exceeds the usable range of servo read element RS1 relative to upper servo pattern edge 406. The PES signal will only be valid over a limited range of movement of RS1. FIG. 8 shows an example of a PES signal that may be obtained over the servo read element range of the upper servo pattern edge 406. The horizontal axis corresponds to the movement of servo read element RS1 with a total usable range of 0–1 distance units. The total usable range of any servo read element relative to the upper servo pattern edge 406 where the PES is reliable and valid may be referred to as the first total displacement of the servo read element. The movement of servo read element RS1 is measured with the highly precise IPS 123.

The vertical axis is the corresponding PES signal obtained over the range of movement of servo read element RS1. The response curve is typically nonlinear and will vary with each servo read element and servo pattern and FIG. 8 shows only one example of a PES signal obtained over the servo read element range of upper servo pattern edge 406. The first measurement position is located at one half of the total usable range of servo read element RS1 and is identified on FIG. 8 by 0.5 on the horizontal axis and by PES 1a on the vertical axis. Because the response curve is typically nonlinear the value of PES 1a is not necessary equal to ½ of the total output range of the PES signal. The first measurement position is identified by PES 1a for the steps that follow.

At step 510, a second measurement position is established in a similar manner as the first measurement position described above. The second measurement position is established at the geometric center of the servo read element RS1's range when the servo read element RS1 is positioned at the lower servo pattern edge 408. This is accomplished by using the periodic signal 710 injected into the head position servo 126 to move servo read element RS1 relative to lower servo pattern edge 408 while monitoring the PES signal. Servo read element RS1 is first placed at index position 3 (FIG. 4) so that the servo read element RS1 is located at lower servo pattern edge 408. Periodic signal 710 is adjusted to move servo read element RS1 over a range that exceeds the usable range of servo read element RS1 relative to lower servo pattern edge 408. The PES signal will only be valid over a limited range of movement of RS1. As described above, FIG. 8 shows an example of a PES signal that may be obtained, however each PES signal response is typically different for each servo pattern edge and each servo read element over the servo read element range. Additionally, it may be determined that the range of validity for the PES is less than the range of 0–1 shown on the horizontal axis of FIG. 8. The total usable range of any servo read element relative to the lower servo pattern edge 408 where the PES is reliable and valid may be referred to as the second total displacement of the servo read element. The movement of servo read element RS1 is measured with the highly precise IPS 123. As in step 508, the second measurement position is located at one half of the total usable range of servo read element RS1 relative to the lower servo pattern edge 408 and is identified by PES 2a (not shown in FIG. 8). Because the response curve is typically nonlinear the value of PES 2a is not necessary equal to ½ of the total output range of the PES signal. The second measurement position is identified by PES 2a for the steps that follow.

At step 512 the displacement of the tape head 120 between the first and second measurement positions is measured. This is accomplished by adjusting the periodic signal 710 injected into the head position servo 126 to move servo read element RS1 between the upper servo pattern edge 406 and the lower servo pattern edge 408 while monitoring the PES signal. The details of the sequence of steps to accomplish step 512 is contained in flowchart 600 shown in FIG. 6. Referring now to FIG. 7, the periodic signal 710 is divided into time periods T1 through T5. Time periods T1, T3 and T5 are representations of the time when periodic signal 710 is exhibiting a relatively large rate of change relative to time periods T2 and T4. At step 602 periodic signal 710 is adjusted so that servo element RS1 is located between the upper servo pattern edge 406 and the lower servo pattern edge 408 during time periods T1, T3, and T5. At step 603, the a head position servo 126 uses IPS 123 as the reference input during time periods T1, T3, and T5 because the PES signal is not valid during this time. The relatively large rate of change of periodic signal 710 during time periods T1, T3 and T5 is used when servo element RS1 is located between the upper servo pattern edge 406 and the lower servo pattern edge 408 to reduce any errors resulting from the movement of magnetic tape 122. This is necessary because PES is not valid and not used as input to head position servo 126 with the result that any movement of magnetic tape 122 relative to tape head 120 is not supplied to head position servo 126 during this time. The relatively large rate of change of time periods T1, T3 and T5 provide for the movement of tape head 120 that is much more rapid than the movement of magnetic tape 122, with the resulting practical effect that any errors produced by the movement of magnetic tape 122 are not significant relative to the desired measurement accuracy. The portions of time T1–T5 may be adjusted further as conditions require from that shown in FIG. 7.

Figure 6:
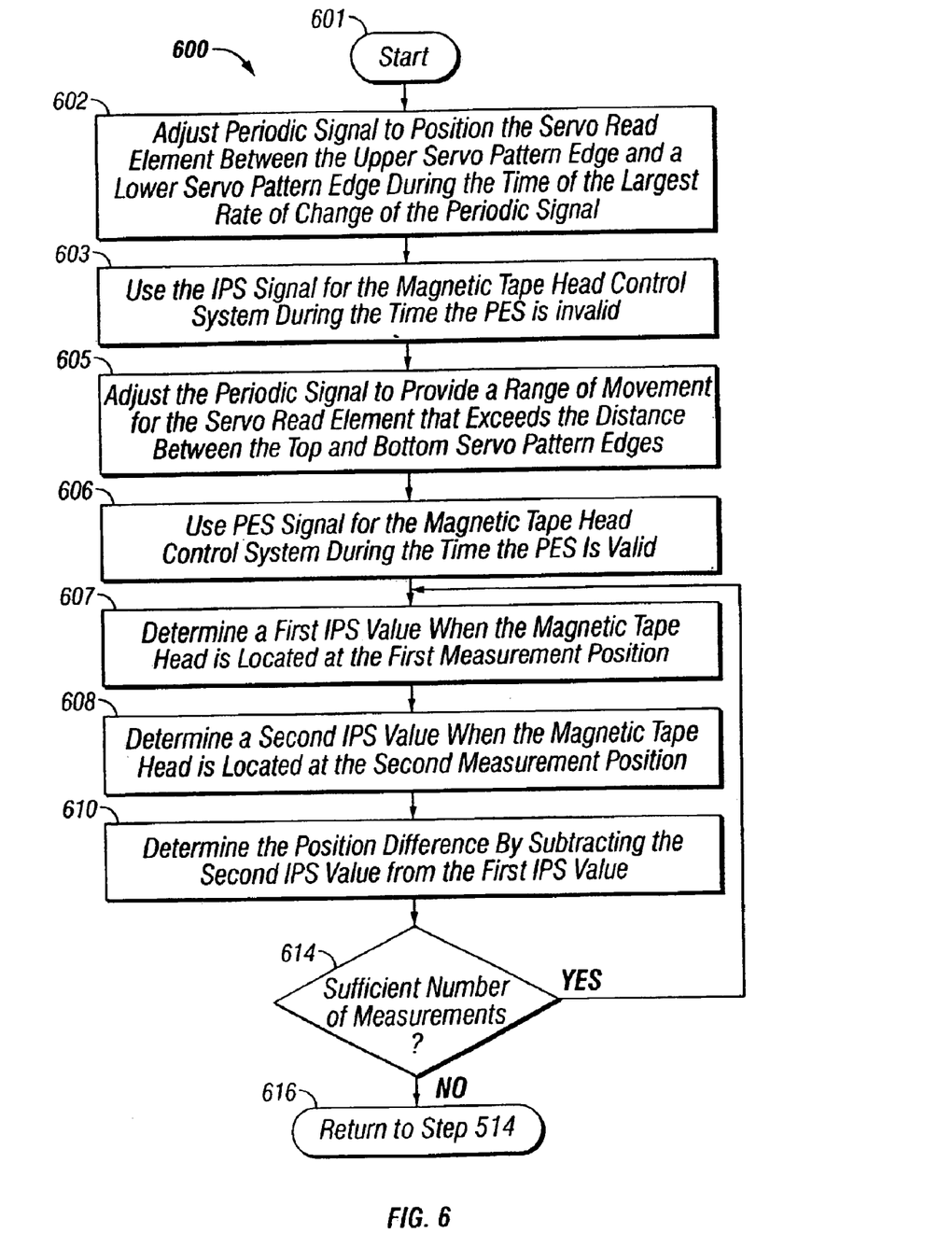
FIG. 6 is a flowchart illustrating an exemplary sequence of steps to collect measurement data necessary to measure the width of a servo pattern written on magnetic tape in accordance with the invention.

At step 605, periodic signal 710 is further adjusted so that servo element RS1 is located in the vicinity of upper servo pattern edge 406 during time period T4 and servo element RS1 is located in the vicinity of lower servo pattern edge 408 during time period T2. Also at step 603, periodic signal 710 is further adjusted so that the total range of movement of servo element RS1 slightly exceeds the total distance between lower servo pattern edge 408 and upper servo pattern edge 406. At step 606, the head position servo 126 uses PES as the reference input during time periods T2 and T4 because the PES signal is valid during this time. Use of the PES for the head position servo 126 during time periods T2 and T4 allows head position servo 126 to establish a reference to the upper servo pattern edge 406 or lower servo pattern edge 408 and to establish the first and second measurement positions because the PES signal is valid during this time. During time period T2, the response curve for servo element RS1 corresponding to the lower servo pattern edge 408 is used to generate PES and during time period T4, the response curve for servo element RS1 corresponding to the upper servo pattern edge 406 is used to generate PES. After the establishment of the above described conditions, the displacement of the tape head 120 between the first and second measurement positions is measured using IPS 123. At step 607, a first IPS value at the first measurement position when the PES is equal to PES 1a is obtained. At step 608, a second IPS value at the second measurement position when the PES is equal to PES 2a is obtained. At step 610, the displacement of the tape head 120 between the first and second measurement positions is obtained by subtracting the second IPS position from the first IPS position. At step 614, the measurements of the displacement of the tape head 120 between the first and second measurement positions are examined to determine if there is a sufficient number of measurements to accurately determine the width of the servo pattern 204. Various criterion may be used to determine if there are enough measurements. Standard statistical methods may be employed to examine the variance, maximum values, minimum values, etc. to make the determination. If there aren't enough measurements to accurately determine the width of the servo pattern 204 then step 614 transfers control back to step 607 to obtain more measurements. Periodic signal 710 is injected into the head position servo 126 under the conditions described above for a period of time necessary to obtain enough statistically valid data to measure the distance between the upper servo pattern edge 406 and the lower servo pattern edge 408. This results in the conditions and measurements for time periods T1, T2, T3, T4 and T5 repeating until sufficient measurement data is collected. The result of this is that multiple samples of the displacement of the tape head 120 between the first and second measurement positions are obtained. The frequency of periodic signal 710 is chosen not to be harmonically related to the fundamental tape guiding frequency to provide measurement data that when processed will remove systematic errors that may otherwise be attributable to harmonic relations between the fundamental tape guiding frequency and periodic signal 710. The fundamental tape guiding frequency is the fundamental frequency of the movement of magnetic tape 122 transverse to the direction of movement by rotation of the reels that spool magnetic tape 122. The fundamental tape guiding frequency may change as the magnetic tape 122 is spooled between the reels holding magnetic tape 122. For example if the fundamental tape guiding frequency is 20 Hz then the frequency of periodic signal 710 may be chosen to be 20.4 Hz. The fundamental frequency of periodic signal 710 may vary as the tape is spooled to provide improved measurement accuracy if necessary.

In addition the direction of the movement of magnetic tape 122 may be reversed during the measurement process to obtain additional samples and to negate potential interactions between the fundamental tape guiding frequency and periodic signal 710. If there are enough measurements to accurately determine the width of the servo pattern 204 then step 614 transfers control to step 616. At step 616 control is transferred to step 514 (FIG. 5). At step 514 the width of the servo pattern 204 is calculated and the periodic signal 710 is removed as an input to the head position servo 126. The width of the servo pattern 204 is calculated by averaging the data obtained for the multiple samples of the displacement of the tape head 120 between the first and second measurement positions to arrive at an accurate measurement of the displacement of the tape head 120. The width of the servo pattern 204 is then determined to be equal to the accurate measurement of the displacement of the tape head 120. Various averaging techniques may be employed to examine the variance, maximum values, minimum values, etc. to discard unreliable measurements to arrive at an accurate determination of the servo pattern width. At step 518 the tape drive operates using the calculated width of the servo pattern from step 514. The tape drive utilizes the resultant width of the servo pattern to adjust the PESs to (1) identify optimal tape head index positions for the best concurrent alignment of data and servo elements with data and servo information on magnetic tape, and (2) identify corrected PESs incorporating a calculated offset, which the servo elements seek to produce in order to precisely track-follow at optimal servo tracking positions.

Each corrected PES is a signal that incorporates a calculated offset, such that a servo element's sustained production of the PES is calculated to align the servo element with the optimal servo tracking position. The corrected PES may be computed by changing the measured PES by a correction factor, the correction factor being proportional to the difference between the nominal servo pattern width and the measured servo pattern width. Accordingly, when a servo element provides the corrected PES, it is predicted to be displaced from the nominal servo pattern edge position the required amount to accurately track at the optimal servo tracking position.

After step 518, the corrected PESs are available for use by head position servo 126 to provide optimal track following in future data access operations using the magnetic tape 120. If at step 516 a new cartridge is inserted into the tape drive then the process described above for steps 504 through 518 are repeated.

Accordingly, when a servo element provides the corrected PES, it is predicted to be displaced from the estimated servo edge position the required amount to accurately track at the optimal servo tracking position.

The following example is provided to illustrate the operation of the computation of corrected PESs in greater detail. In this example the servo pattern width is 80 microns. For this example, it is assumed that the calculated servo pattern width obtained by the computation of step 514 is 76 microns. To apply the necessary correction to the upper servo pattern edge, it is necessary to servo lower by using a corrected PES value of one half of the difference between 80 and 76 microns. On the lower servo pattern edge, it is necessary to servo higher by the same amount. Accordingly, when a servo element provides a PES of minus two microns which indicates the servo edge is two microns higher, the servo element is tracking on the optimal servo tracking position.

The width of the servo pattern written on the magnetic tape varies under a variety of conditions. Therefore, the actual width of this band must be measured each time the magnetic tape is introduced to a drive. The magnetic tape drive, according to the present invention, uses the procedure of FIG. 5 to measure the actual width of the band each time the magnetic tape is introduced to the drive as a part of a initialization process. After the drive calibrates the response curve of each servo reader on each servo edge via the initialization algorithms, the width of the servo pattern may be measured accurately.

While there have been shown what are presently considered to be a preferred embodiment of this invention it would be apparent to those skilled in the art that various changes and modifications can be made herein without departing from the scope of the invention as defined by the appended claims.

What is claimed is:

1. A method for measuring the width of a servo pattern on a magnetic tape, said servo pattern providing input to a head position servo to maintain the position of a magnetic tape head relative to said magnetic tape, comprising the steps of:

injecting a periodic signal into said head position servo to displace said magnetic tape head relative to said magnetic tape;

determining a first measurement position;

determining a second measurement position;

measuring a displacement of said magnetic tape head between said first measurement position and a said second measurement position; and determining said width of said servo pattern as equal to said displacement of said magnetic tape head.

2. The method of claim 1, wherein the step of determining a first measurement position further comprises the steps of:

determining a first total displacement of a servo read element when said servo read element is positioned in proximity of an upper servo pattern edge and a position error signal is valid; and identifying said first measurement position as the value of said position error signal corresponding to placement of said servo read element at the midpoint of said first total displacement.

3. The method of claim 1, wherein the step of determining a second measurement position further comprises the steps of:

determining a second total displacement of a servo read element when said servo read element is positioned in proximity of a lower servo pattern edge and a position error signal is valid; and identifying said second measurement position as the value of said position error signal corresponding to placement of said servo read element at the midpoint of said second total displacement.

4. The method of claim 1, wherein a fundamental frequency of said periodic signal is greater than a fundamental tape guiding frequency of said magnetic tape.

5. The method of claim 1, wherein a fundamental frequency of said periodic signal is not harmonically related to a fundamental tape guiding frequency of said magnetic tape.

6. The method of claim 1, wherein the measuring step further comprises the steps of:
(A) adjusting said periodic signal to position a servo read element between an upper servo pattern edge and a lower servo pattern edge during the time of the largest rate of change of said periodic signal;
(B) adjusting said periodic signal to provide a range of movement of said servo read element that exceeds a distance between said upper servo pattern edge and said lower servo pattern edge;
(C) providing a position error signal to said head position servo during the time said position error signal is determined to be valid;
(D) providing a independent position sensor signal to said head position servo during the time said position error signal is determined to be invalid;
(E) determining a first independent position sensor value when said magnetic tape head is located at said first measurement position;
(F) determining a second independent position sensor value when said magnetic tape head is located at said second measurement position;
(G) determining a position difference by subtracting said second independent position sensor value from said first independent position sensor value;
(H) repeating steps E, F and G to obtain multiple values of said position difference; and
(I) determining a measurement of said displacement of said magnetic tape head between said first measurement position and said second measurement position by averaging said multiple values of said position difference.

7. The method of claim 6, further comprising the steps of:
Obtaining said position error signal from said servo read element when said servo read element is positioned in proximity of said upper servo edge and said during the time said position error signal is determined to be valid; and
Obtaining said position error signal from said servo read element when said servo read element is positioned in proximity of said lower servo edge and said during the time said position error signal is determined to be valid.

8. A data storage apparatus comprising:
A magnetic tape head having multiple servo elements;
an independent position sensor (IPS) coupled to said magnetic tape head to provide positioning information for said magnetic tape head;
an actuator coupled to said magnetic tape head to position said magnetic tape head relative to a magnetic tape;
a position error detection controller to generate position error signals (PESs) each indicating a distance between a servo element and a servo edge of a servo pattern on said magnetic tape;
a head position servo to maintain the position of said magnetic tape head relative to said magnetic tape;
a control unit coupled to said IPS, said actuator, said head position servo and said position error detection controller, said control unit programmed to perform steps for measuring the width of said servo pattern on said magnetic tape, comprising the steps of:
injecting a periodic signal into said head position servo to displace said magnetic tape head relative to said magnetic tape;
determining a first measurement position;
determining a second measurement position;
measuring a displacement of said magnetic tape head between said first measurement position and a said second measurement position; and
determining said width of said servo pattern as equal to said displacement of said magnetic tape head.

9. The data storage apparatus of claim 8, wherein the step of determining a first measurement position further comprises the steps of:
determining a first total displacement of a servo read element when said servo read element is positioned in proximity of an upper servo pattern edge and a position error signal is valid; and
identifying said first measurement position as the value of said position error signal corresponding to placement of said servo read element at the midpoint of said first total displacement.

10. The data storage apparatus of claim 8, wherein the step of determining a second measurement position further comprises the steps of:
determining a second total displacement of a servo read element when said servo read element is positioned in proximity of a lower servo pattern edge and a position error signal is valid; and
identifying said second measurement position as the value of said position error signal corresponding to placement of said servo read element at the midpoint of said second total displacement.

11. The data storage apparatus of claim 8, wherein a fundamental frequency of said periodic signal is greater than a fundamental tape guiding frequency of said magnetic tape.

12. The data storage apparatus of claim 8, wherein a fundamental frequency of said periodic signal is not harmonically related to a fundamental tape guiding frequency of said magnetic tape.

13. The data storage apparatus of claim 8, wherein the measuring step further comprises the steps of:
(A) adjusting said periodic signal to position a servo read element between a upper servo pattern edge and a lower servo pattern edge during the time of the largest rate of change of said periodic signal;
(B) adjusting said periodic signal to provide a range of movement of said servo read element that exceeds a distance between said upper servo pattern edge and said lower servo pattern edge;
(C) providing a position error signal to said head position servo during the time said position error signal is determined to be valid;
(D) providing a independent position sensor signal to said head position servo during the time said position error signal is determined to be invalid;
(E) determining a first independent position sensor value when said magnetic tape head is located at said first measurement position;

(F) determining a second independent position sensor value when said magnetic tape head is located at said second measurement position;

(G) determining a position difference by subtracting said second independent position sensor value from said first independent position sensor value;

(H) repeating steps E, F and G to obtain multiple values of said position difference; and (I) determining a measurement of said displacement of said magnetic tape head between said first measurement position and said second measurement position by averaging said multiple values of said position difference.

14. The data storage apparatus of claim 13, wherein said position error signal is obtained from said servo read element when said servo read element is positioned in proximity of said upper servo edge and when said servo read element is positioned in proximity of said lower servo edge and said during the time said position error signal is determined to be valid.

15. An article of manufacture comprising a data storage medium tangibly embodying a program of machine-readable instructions executable by a digital processing apparatus to perform method steps for measuring the width of a servo pattern on a magnetic tape, said servo pattern providing input to a head position servo to maintain the position of a magnetic tape head relative to said magnetic tape, said method steps comprising:

injecting a periodic signal into said head position servo to displace said magnetic tape head relative to said magnetic tape;

determining a first measurement position;

determining a second measurement position;

measuring a displacement of said magnetic tape head between said first measurement position and a said second measurement position; and determining said width of said servo pattern as equal to said displacement of said magnetic tape head.

16. The article of manufacture of claim 15, wherein the step of determining a first measurement position further comprises the steps of:

determining a first total displacement of a servo read element when said servo read element is positioned in proximity of an upper servo pattern edge and a position error signal is valid; and identifying said first measurement position as the value of said position error signal corresponding to placement of said servo read element at the midpoint of said first total displacement.

17. The article of manufacture of claim 15, wherein the step of determining a second measurement position further comprises the steps of:

determining a second total displacement of a servo read element when said servo read element is positioned in proximity of a lower servo pattern edge and a position error signal is valid; and identifying said second measurement position as the value of said position error signal corresponding to placement of said servo read element at the midpoint of said second total displacement.

18. The article of manufacture of claim 15, wherein a fundamental frequency of said periodic signal is greater than a fundamental tape guiding frequency of said magnetic tape.

19. The article of manufacture of claim 15, wherein a fundamental frequency of said periodic signal is not harmonically related to a fundamental tape guiding frequency of said magnetic tape.

20. The article of manufacture of claim 15, wherein the measuring step further comprises the steps of:

(A) adjusting said periodic signal to position a servo read element between an upper servo pattern edge and a lower servo pattern edge during the time of the largest rate of change of said periodic signal;

(B) adjusting said periodic signal to provide a range of movement of said servo read element that exceeds a distance between said upper servo pattern edge and said lower servo pattern edge;

(C) providing a position error signal to said head position servo during the time said position error signal is determined to be valid;

(D) providing a independent position sensor signal to said head position servo during the time said position error signal is determined to be invalid;

(E) determining a first independent position sensor value when said magnetic tape head is located at said first measurement position;

(F) determining a second independent position sensor value when said magnetic tape head is located at said second measurement position;

(G) determining a position difference by subtracting said second independent position sensor value from said first independent position sensor value;

(H) repeating steps E, F and G to obtain multiple values of said position difference; and (I) determining a measurement of said displacement of said magnetic tape head between said first measurement position and said second measurement position by averaging said multiple values of said position difference.

21. The article of manufacture of claim 20, wherein said position error signal is obtained from said servo read element when said servo read element is positioned in proximity of said upper servo edge and when said servo read element is positioned in proximity of said lower servo edge and said during the time said position error signal is determined to be valid.

* * * * *